United States Patent
Chen et al.

(10) Patent No.: US 10,415,617 B2
(45) Date of Patent: Sep. 17, 2019

(54) CONNECTING STRUCTURE AND COVERING DEVICE FOR OPENING OF BUILDING

(71) Applicant: NIEN MADE ENTERPRISE CO., LTD., Taichung (TW)

(72) Inventors: Lin Chen, Guangdong (CN); Keng-Hao Nien, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 178 days.

(21) Appl. No.: 15/614,005

(22) Filed: Jun. 5, 2017

(65) Prior Publication Data
US 2018/0030736 A1  Feb. 1, 2018

(30) Foreign Application Priority Data
Jul. 26, 2016 (CN) .................... 2016 2 0787582 U

(51) Int. Cl.
*F16B 12/30* (2006.01)
*F16B 12/14* (2006.01)
(Continued)

(52) U.S. Cl.
CPC .......... *F16B 12/14* (2013.01); *E04F 13/0823* (2013.01); *E06B 9/04* (2013.01);
(Continued)

(58) Field of Classification Search
CPC .......... E04B 2002/7477; E04F 13/0823; F16B 7/044; F16B 7/0453; F16B 7/048;
(Continued)

(56) References Cited

U.S. PATENT DOCUMENTS 4,811,508 A * 3/1989 Engelbach .............. F16B 12/20
403/374.3
5,173,001 A * 12/1992 Schunke ................. F16B 7/187
403/252
(Continued)

FOREIGN PATENT DOCUMENTS

AT         12448 U1 *  5/2012 .............. F16B 7/187
CH       692689 A5 *  9/2002 .............. F16B 7/187
(Continued)

*Primary Examiner* — Josh Skroupa
(74) *Attorney, Agent, or Firm* — Muncy, Geissler, Olds & Lowe, P.C.

(57) ABSTRACT

A connecting structure, which is located between a first object and a second object, includes a first engaging member and a second engaging member located between the first engaging member and the first object. The first engaging member is located between the second engaging member and the second object. The second engaging member has a thickness. When a distance between the first engaging member and the first object is less than or equal to said thickness, the first engaging member and the second engaging member are not movable relative to each other. When said distance is greater than said thickness, the first engaging member and the second engaging member can be moved in a direction relative to each other, moving the first object and the second object relative to each other as well. A covering device for an opening of a building is also disclosed, which includes said connecting structure.

7 Claims, 12 Drawing Sheets

(51) Int. Cl.
 *F16B 7/04* (2006.01)
 *F16B 7/18* (2006.01)
 *E04F 13/08* (2006.01)
 *E06B 9/04* (2006.01)
(52) U.S. Cl.
 CPC .............. *F16B 7/0453* (2013.01); *F16B 7/187* (2013.01); *F16B 12/30* (2013.01); *Y10T 403/7069* (2015.01); *Y10T 403/7105* (2015.01)
(58) Field of Classification Search
 CPC .......... F16B 7/0486; F16B 7/18; F16B 7/187; F16B 9/026; F16B 9/054; F16B 12/14; F16B 12/20; F16B 12/30; F16B 12/32; F16B 12/2054; F16B 12/2063; F16B 2200/403; Y10T 403/39; Y10T 403/4674; Y10T 403/4681; Y10T 403/4685; Y10T 403/7067; Y10T 403/7069; Y10T 403/7105
 USPC ......... 403/187, 256, 258, 260, 374.3, 374.4, 403/385
 See application file for complete search history.

(56) References Cited

U.S. PATENT DOCUMENTS

| | | | |
|---|---|---|---|
| 6,712,543 B1 * | 3/2004 | Schmalzhofer | F16B 7/187 403/260 |
| 9,393,895 B2 * | 7/2016 | Cardona | F16B 7/187 |
| 2007/0154258 A1 * | 7/2007 | Knapp | F16B 12/20 403/331 |

FOREIGN PATENT DOCUMENTS

| | | | | |
|---|---|---|---|---|
| DE | 2732048 A1 * | 1/1978 | ............ | F16B 7/025 |
| DE | 3604989 A * | 8/1987 | ............ | F16B 7/187 |
| DE | 9313596 U1 * | 10/1993 | ............ | F16B 7/187 |
| DE | 4244396 A1 * | 6/1994 | ............ | F16B 7/187 |
| DE | 202012104972 U1 * | 1/2013 | ............ | F16B 7/187 |
| EP | 2458229 A1 * | 5/2012 | ............ | F16B 7/187 |
| WO | WO-2006089539 A1 * | 8/2006 | ............ | F16B 12/20 |

\* cited by examiner

CONNECTING STRUCTURE AND COVERING DEVICE FOR OPENING OF BUILDING

BACKGROUND OF THE INVENTION

1. Technical Field

The present invention relates generally to a structure for connecting objects, and more particularly to a connecting structure which could adjust a relative position of the interconnected objects.

2. Description of Related Art

Typically, objects are connected to construct a unit with a specific function. For instance, a window frame is composed of a plurality of straight bars, forming an enclosed frame body to be easily installed with a covering device. In a frame that requires a dividing member to separate different shaded areas, the dividing member is fixed between two parallel straight bars, and is perpendicular to the connected straight bars. However, a conventional dividing member is not movable once assembled. In other words, the dividing member cannot be fine-tuned during the process of installing the covering device, which is inconvenient for the installation. In some cases, the covering device can only be installed with obvious structural defects.

BRIEF SUMMARY OF THE INVENTION

In view of the above, one objective of the present invention is to provide a connecting structure, which could moderately adjust a relative position of the interconnected objects to enhance the convenience and flexibility during installation.

The present invention provides a connecting structure located between a first object and a second object, including a first engaging member and a second engaging member located between the first engaging member and the first object, wherein the first engaging member is located between the second engaging member and the second object. A thickness of the second engaging member is defined as a first thickness. When a distance between the first engaging member and the first object is less than or equal to the first thickness, the first engaging member and the second engaging member are not movable relative to each other. When the distance between the first engaging member and the first object is greater than the first thickness, the first engaging member and the second engaging member are adapted to be moved relative to each other in a direction, moving the first object and the second object relative to each other at the same time.

In an embodiment, the first engaging member is connected to the first object, and has a hole. A width of the hole in the direction is defined as a first width. The second engaging member includes a base and a protrusion located on the base. A width of the protrusion in the direction is defined as a second width, and the second width is less than the first width. The base is located between the first engaging member and the first object. The protrusion passes through the hole, and is connected to the second object.

In an embodiment, the distance between the first engaging member and the first object is a distance between a bottom surface of the first engaging member and a top surface of the first object. The first thickness of the second engaging member is a thickness of the base of the second engaging member.

In an embodiment, a thickness of the protrusion of the second engaging member is defined as a second thickness. A thickness of the first engaging member is defined as a third thickness. The second thickness is greater than the third thickness.

In an embodiment, a length of the first engaging member in the direction is defined as a first length. A length of the base of the second engaging member in the direction is defined as a second length. The first length is greater than the second length.

In an embodiment, further including at least one first locking member connecting the first engaging member and the first object, and at least one second locking member connecting the second engaging member and the second object.

In an embodiment, the first engaging member has at least one first bore. The second engaging member has at least one second bore and at least one notch. The at least one second bore goes through the base and the protrusion. The at least one notch recesses into a peripheral edge of the base in the direction. The at least one first locking member passes through the at least one first bore and the at least one notch to be locked into the first object. The at least one second locking member passes through the at least one second bore to be locked into the second object.

The present invention further provides a covering device for an opening of a building. The covering device includes a frame and at least one covering structure, wherein the frame includes a plurality of structural components, at least one dividing member, and at least one connecting structure. The at least one dividing member is located between two of the structural components. At least one end of the at least one dividing member is connected to one of the structural components through the at least one connecting structure. The at least one covering structure is connected to the structural components, the at least one dividing member, or an assembly composed of the structural components and the at least one dividing member. The connecting structure includes a first engaging member and a second engaging member. The first engaging member is located between the at least one dividing member and one of the structural components which the at least one dividing member is connected to. The second engaging member is located between the first engaging member and one of the structural components which the at least one dividing member is connected to, wherein the first engaging member is located between the at least one dividing member and the second engaging member. A thickness of the second engaging member is defined as a first thickness. When a distance between the first engaging member and the corresponding structural component is less than or equal to the first thickness, the first engaging member and the second engaging member are not movable relative to each other. When the distance between the first engaging member and the corresponding structural component is greater than the first thickness, the first engaging member and the second engaging member are adapted to be moved in a direction, moving the corresponding structural component and the at least one dividing member relative to each other at the same time.

In an embodiment, the first engaging member has a hole. A width of the hole in the direction is defined as a first width. The second engaging member includes a base and a protrusion located on the base. A width of the protrusion in the direction is defined as a second width, and the second width is less than the first width. The base is located between the first engaging member and the corresponding structural component. The protrusion passes through the hole, and is connected to the at least one dividing member.

In an embodiment, the distance between the first engaging member and the corresponding structural component is a distance between a bottom surface of the first engaging member and a top surface of the corresponding structural component. The first thickness of the second engaging member is a thickness of the base of the second engaging member.

In an embodiment, a thickness of the protrusion of the second engaging member is defined as a second thickness. A thickness of the first engaging member is defined as a third thickness. The second thickness is greater than the third thickness.

In an embodiment, the frame has a groove, and the first engaging member and the second engaging member are located in the groove. The distance between the first engaging member and the corresponding structural component is a distance between a bottom surface of the first engaging member and a bottom surface of the groove. The first thickness of the second engaging member is a thickness of the base of the second engaging member.

In an embodiment, a length of the first engaging member in the direction is defined as a first length. A length of the base of the second engaging member in the direction is defined as a second length. The first length is greater than the second length.

In an embodiment, further including at least one first locking member connecting the first engaging member and the corresponding structural component, and at least one second locking member connecting the second engaging member and the at least one dividing member In an embodiment, the first engaging member has at least one first bore. The second engaging member has at least one second bore and at least one notch. The at least one second bore goes through the base and the protrusion. The at least one notch recesses into a peripheral edge of the base in the direction. The at least one first locking member passes through the at least one first bore and the at least one notch to be locked into the corresponding structural component. The at least one second locking member passes through the at least one second bore to be locked into the dividing member.

By providing the connecting structure of the present invention in the middle, the position of the objects could be moderately adjusted to be firmly connected then.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
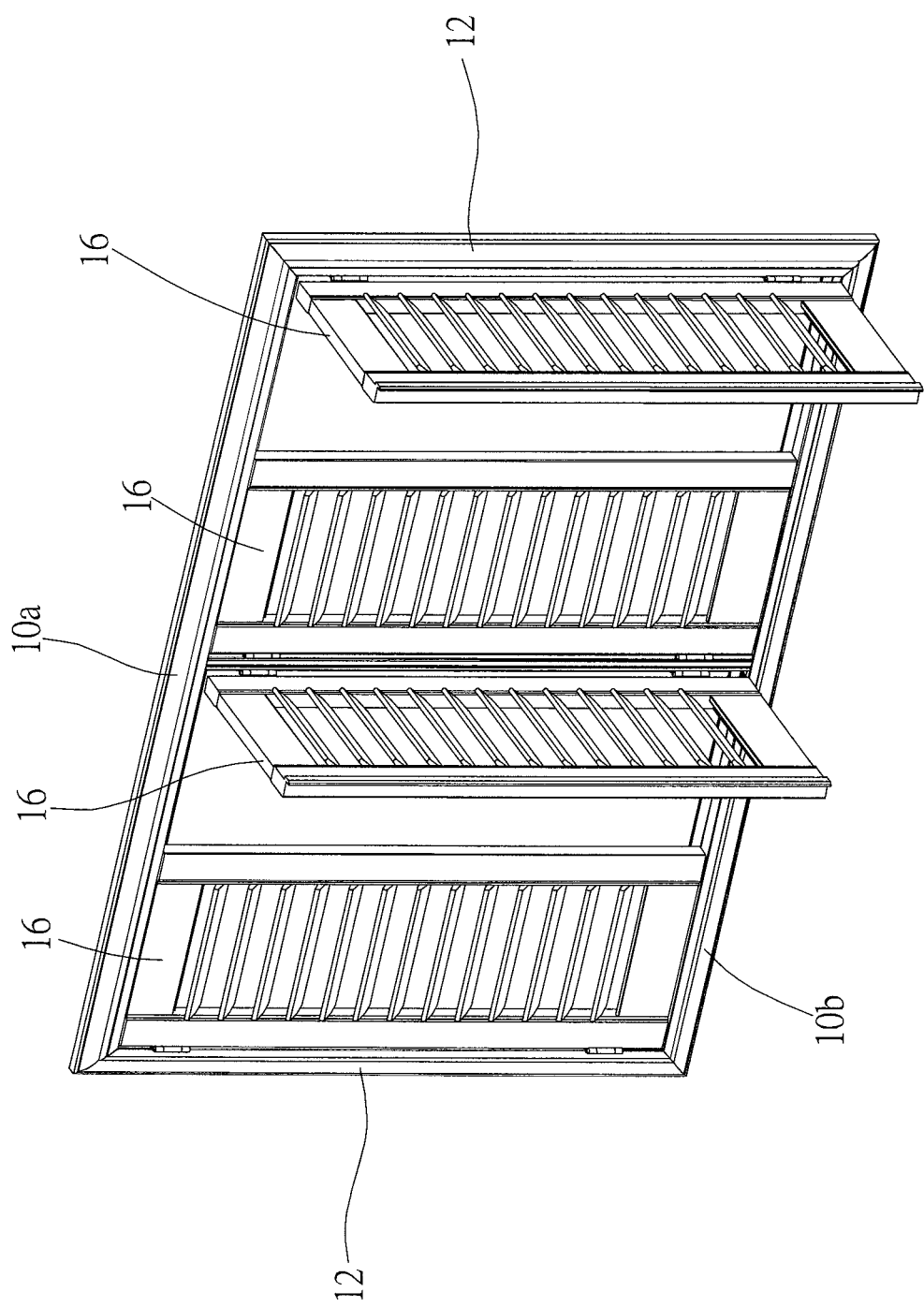
FIG. 1 is a perspective view, showing a covering device for an opening of a building includes the connecting structure of an embodiment of the present invention.
Figure 2:
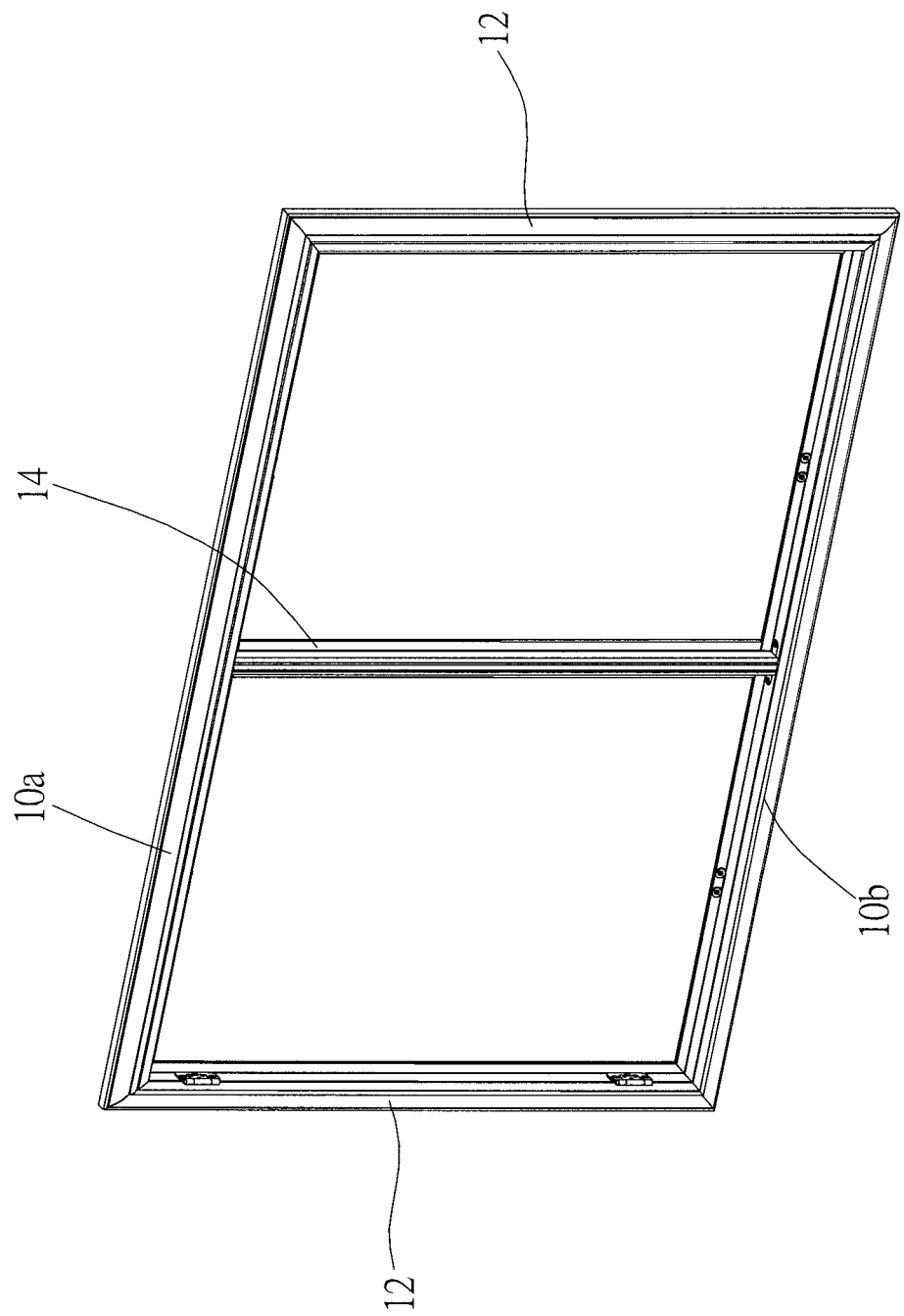
FIG. 2 is a perspective view, showing the frame of FIG. 1 includes the connecting structure of the embodiment of the present invention.
Figure 3:
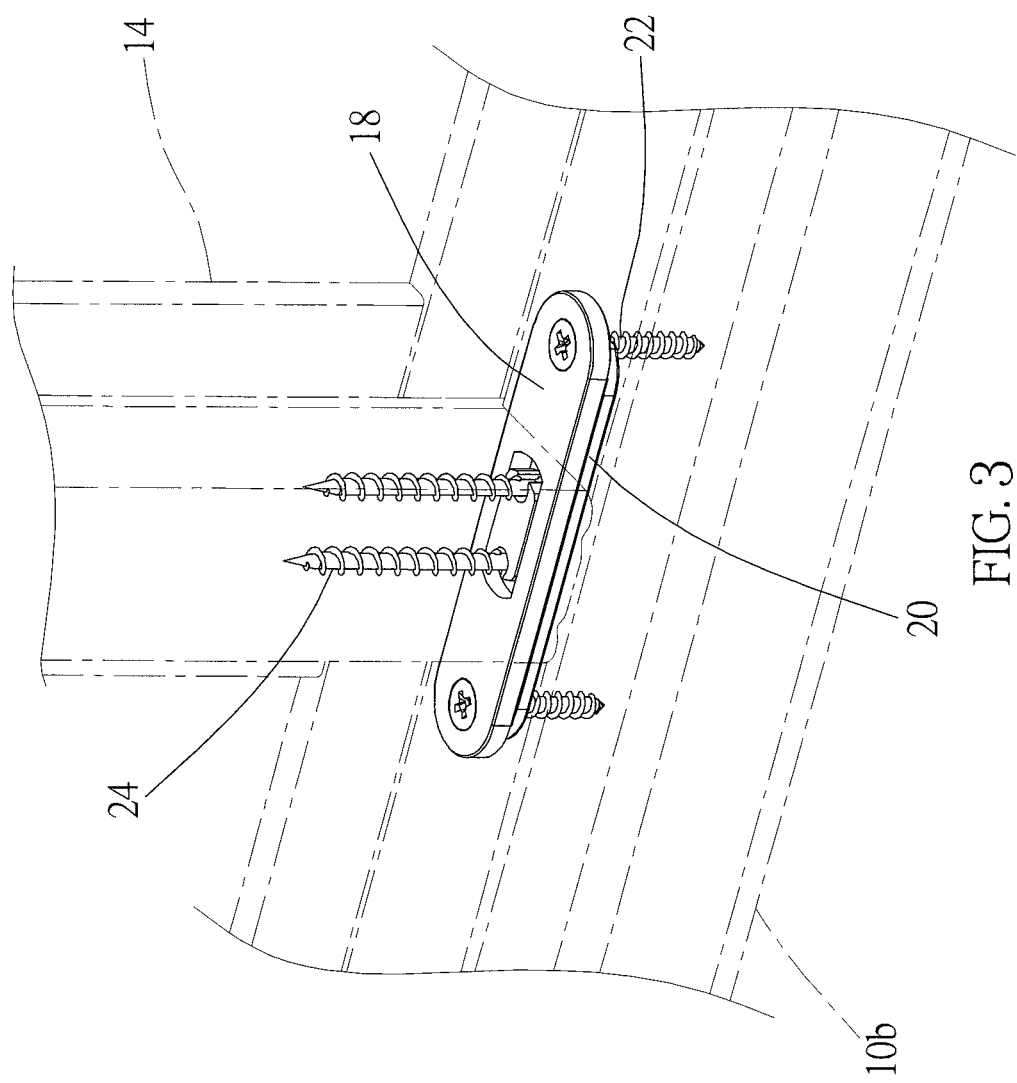
FIG. 3 and FIG. 4 are partial enlarged views of FIG. 2, showing the structural relationship between the connecting structure of the embodiment of the present invention, the first object, and the second object.
Figure 4:
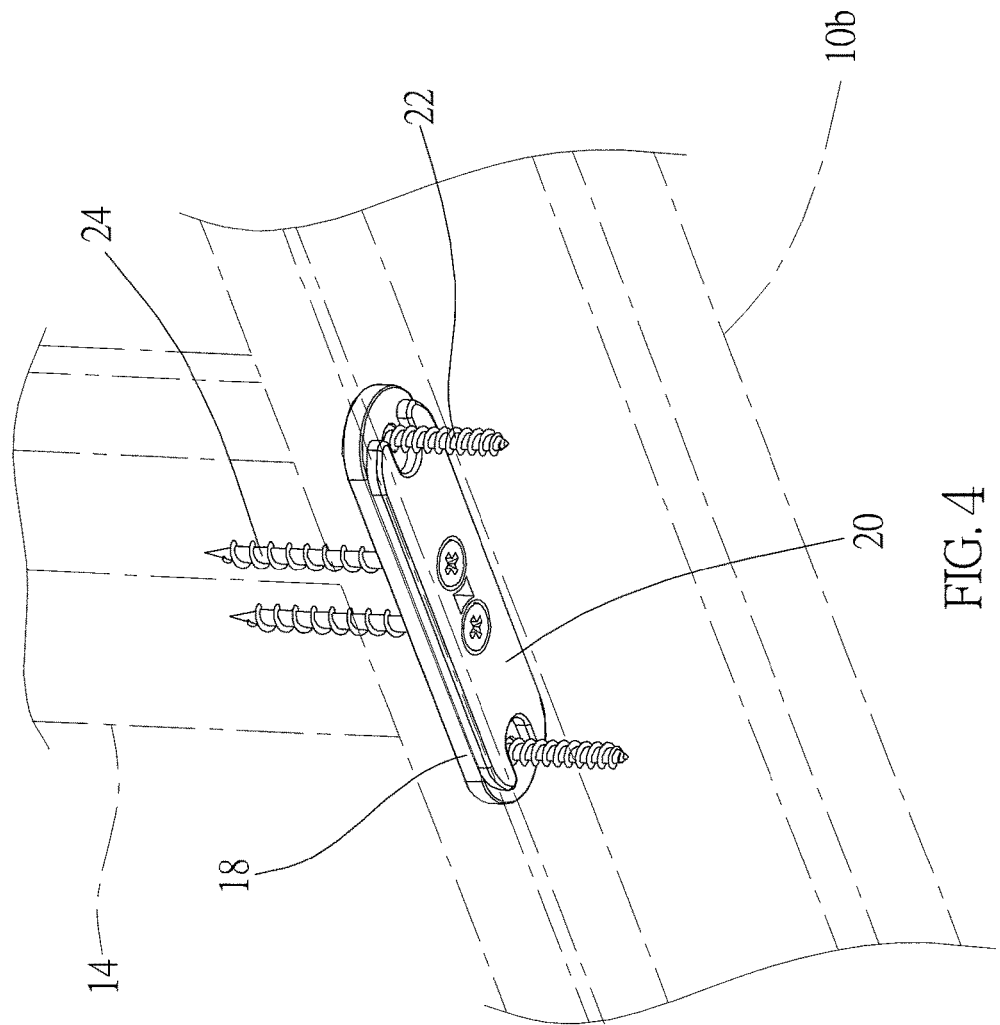

A covering device for an opening of a building illustrated in FIG. 1 and FIG. 2 includes two connecting structures of an embodiment of the present invention. The covering device includes a frame and a covering structure, wherein the frame includes two horizontal structural components 10a, 10b, two vertical structural components 12, and a dividing member 14. Two ends of the dividing member 14 are connected to the horizontal structural components 10a, 10b, respectively. The covering structure is composed of four casements 16, wherein two of the four casements 16 are provided between one of the vertical structural components 12 and the dividing member 14, while the other two of the four casements 16 are provided between the other one of the vertical structural components 12 and the driving member 14. Each of the casements 16 is pivotally connected to the corresponding vertical structural component 12 or the dividing member 14. In addition, the frame further includes said two connecting structures of the embodiment of the present invention, one of which is provided between one of the horizontal structural components (say, the horizontal structural component 10a) and the dividing member 14, while the other one is provided between the other one of the horizontal structural components (i.e., the horizontal structural component 10b) and the dividing member 14. For ease of explanation, we will only describe the details of one of the connecting structures in the following paragraphs, for the connecting structures have substantially the same configurations. Said horizontal structural components 10a, 10b could be each regarded as a first object, and said dividing member 14 could be regarded as a second object.

As shown in FIG. 3 to FIG. 11, the connecting structure of the current embodiment includes a first engaging member 18, a second engaging member 20, two first locking members 22, and two second locking members 24. Said first locking members 22 and said second locking members 24 are screws as an example. However, this is not a limitation of the present invention.

Figure 5:
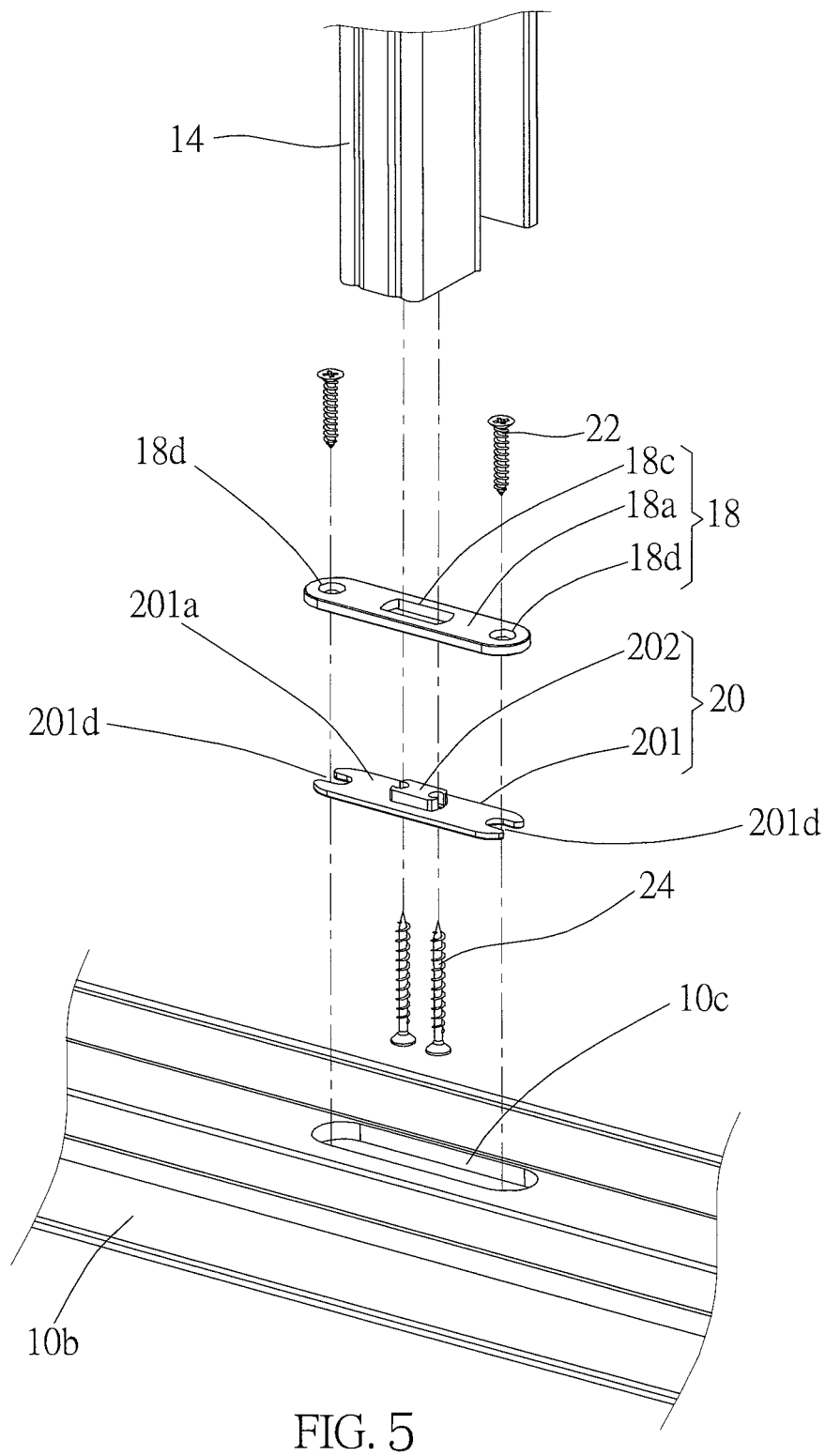
FIG. 5 and FIG. 6 are exploded views respective to FIG. 3 and FIG. 4.
Figure 6:
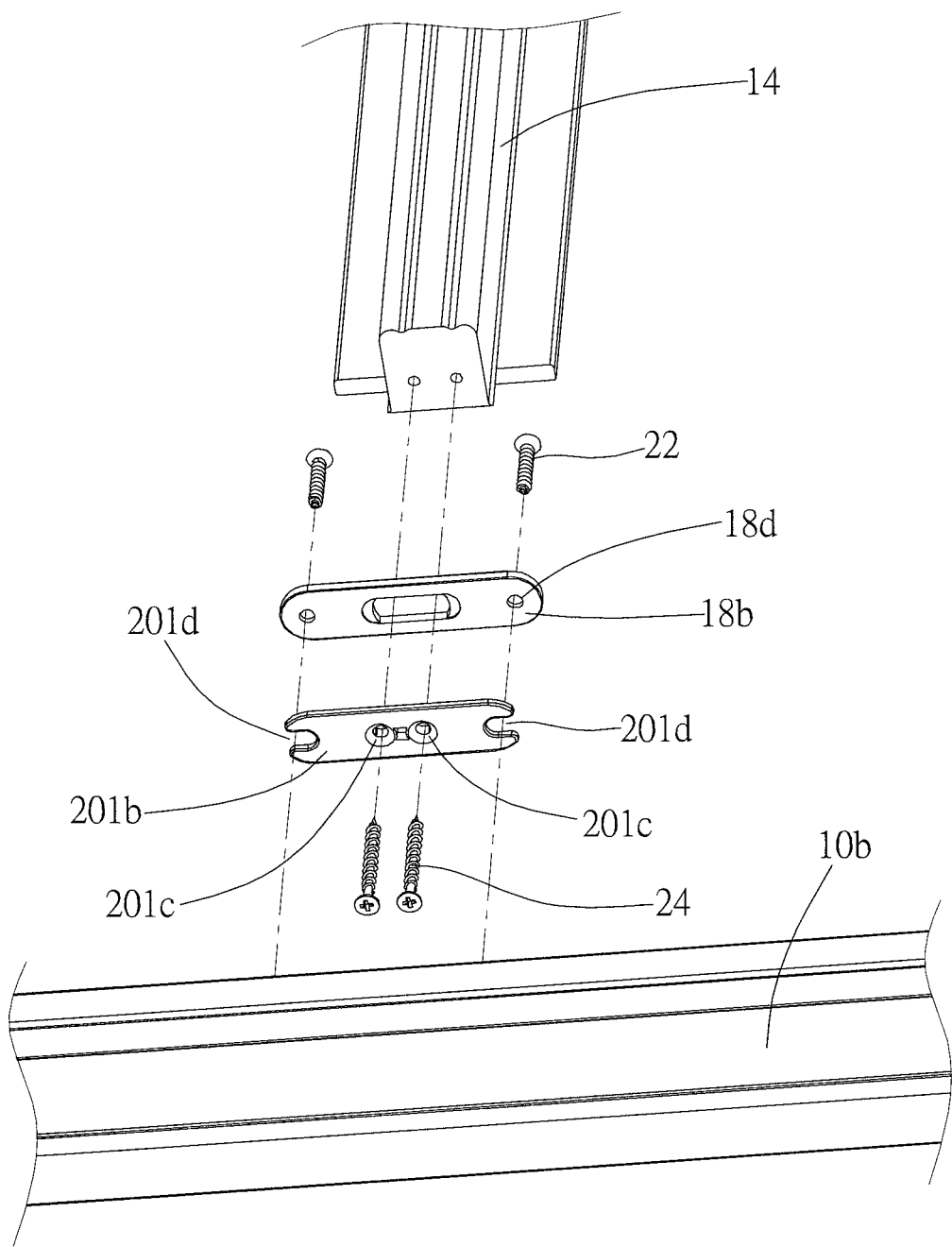
Figure 7:
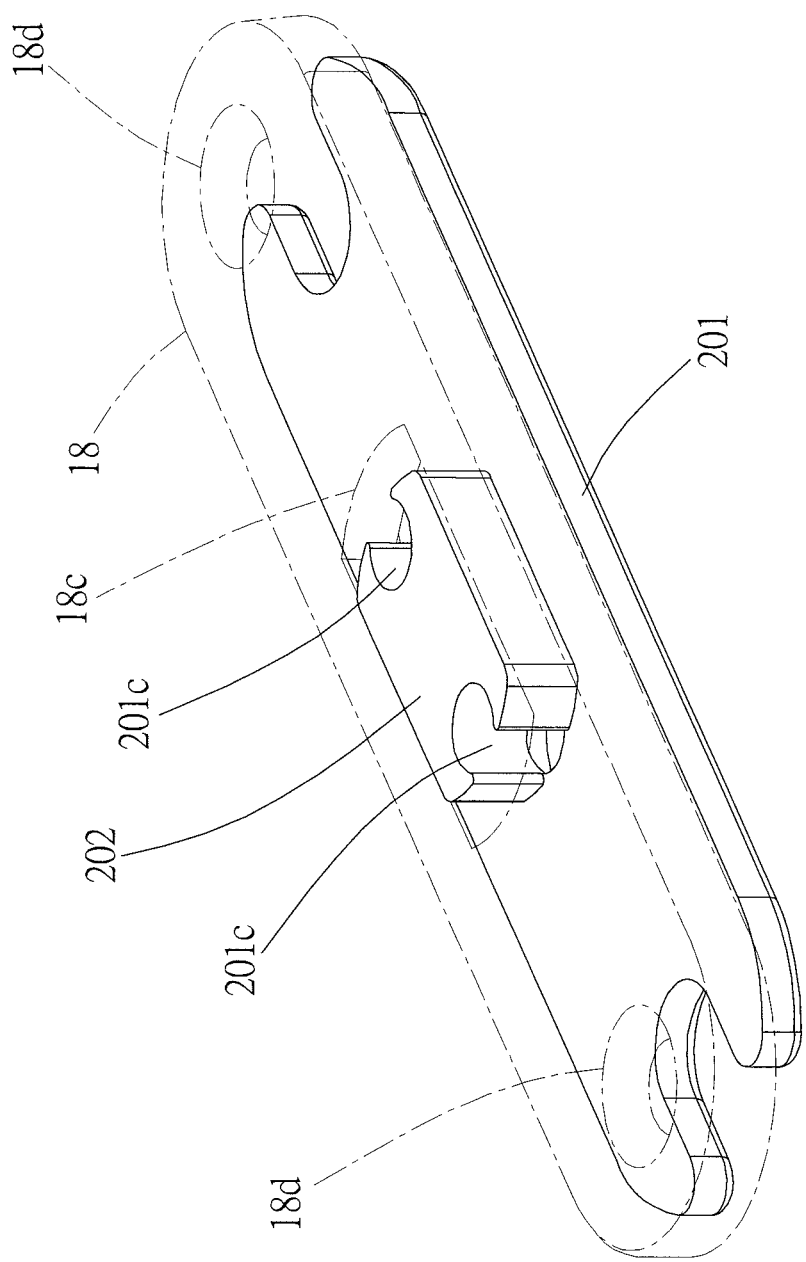
FIG. 7 is a perspective view, showing the first engaging member and the second engaging member of the connecting structure of the embodiment of the present invention.

As it can be seen in FIG. 5 to FIG. 10, the first engaging member 18 could be a long metal plate having two round ends. However, this is not a limitation of the present invention. As illustrated in FIG. 6 and FIG. 7, the first engaging member 18 has a first obverse 18a, a first reverse 18b opposite to the first obverse 18a, a hole 18c, and two first bores 18d, wherein the hole 18c and the first bores 18d go through the first obverse 18a and the first reverse 18b. The hole 18c is narrow and long in shape, and the first bores 18d are provided on two lateral sides of the hole 18c, respectively. A thickness of the first engaging member 18 is defined as a third thickness T3. In addition, a length of the first engaging member 18 in a direction D1 passing through two outermost edges of the two round ends thereof is defined as a first length L1. Similarly, a width of the hole 18c in the direction D1 is defined as a first width W1.

Figure 8:
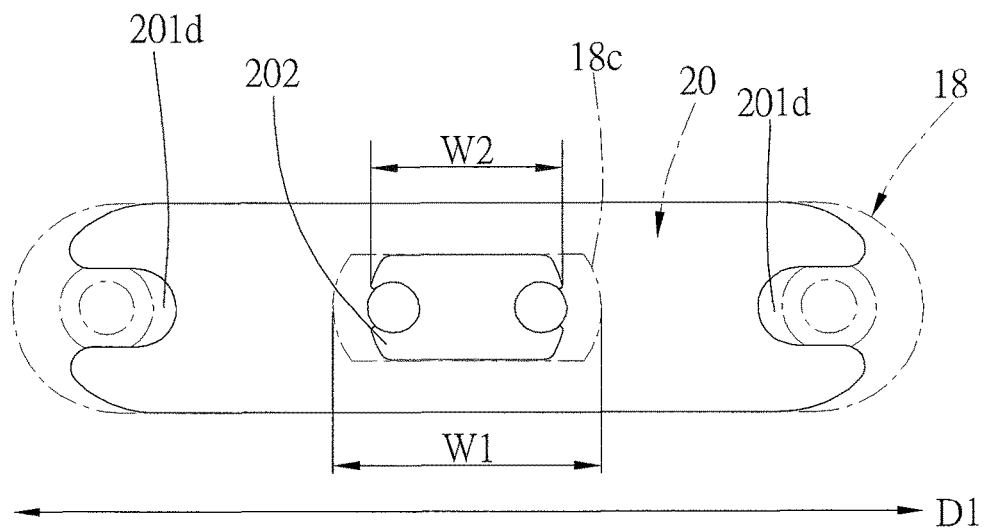
FIG. 8 is a top view of FIG. 7, showing the second width W2 of the protrusion of the second engaging member is less than the first width W1 of the hole of the first engaging member.
Figure 9:
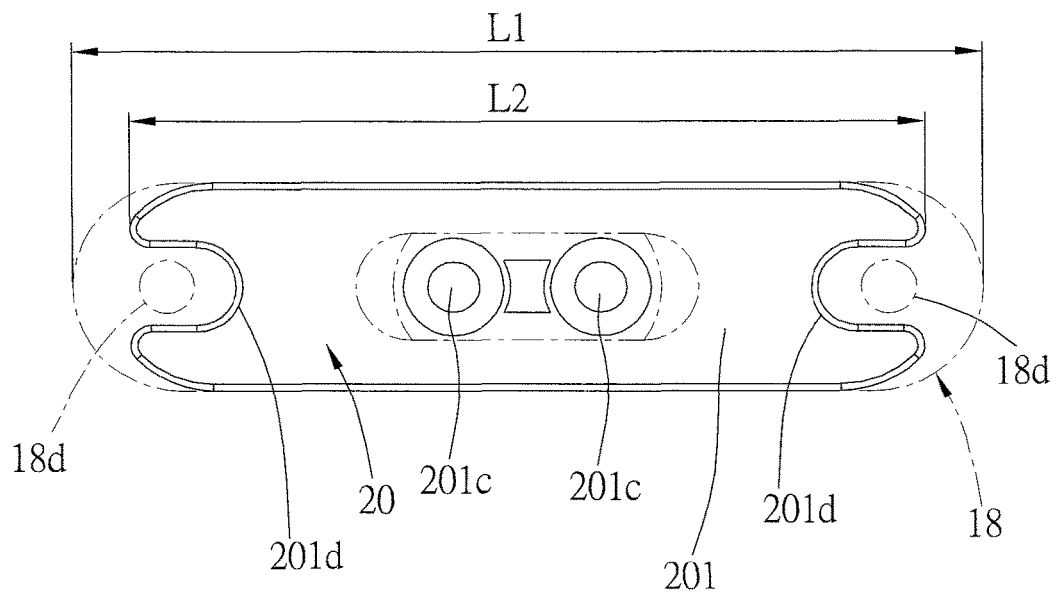
FIG. 9 is a bottom view of FIG. 7, showing the second length L2 of the base of the second engaging member is greater than the first length L1 of the first engaging member.
Figure 10:
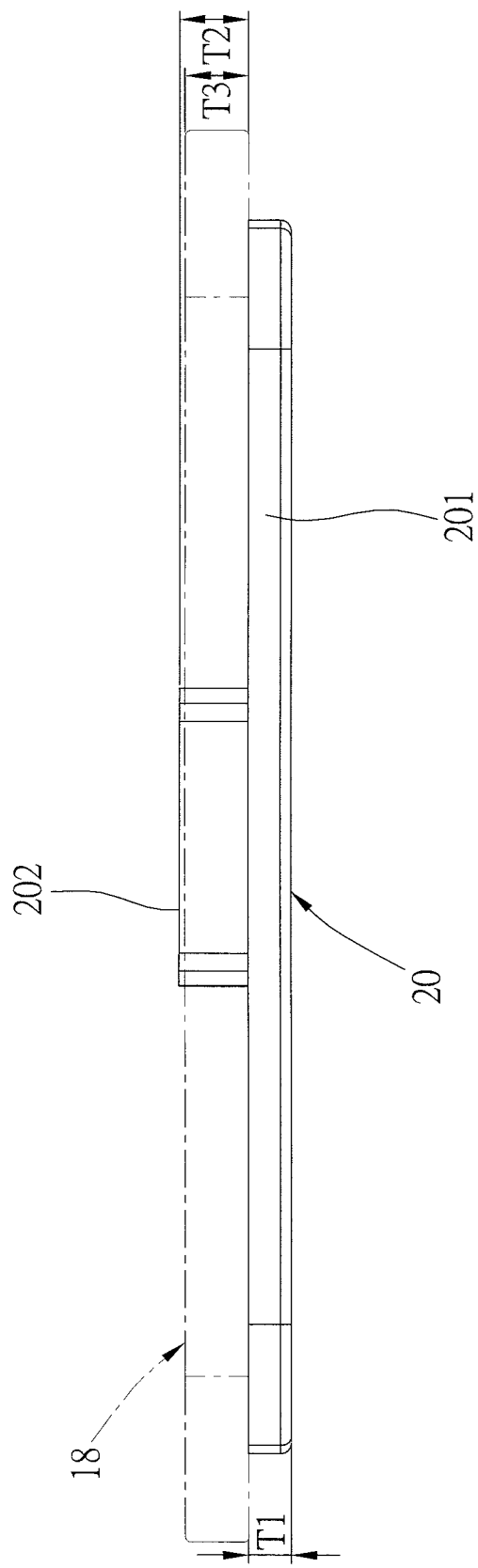
FIG. 10 is a side view of FIG. 7, showing the second thickness T2 of the protrusion of the second engaging member is greater than the third thickness T3 of the first engaging member.

The second engaging member 20 could be a long component which is made of plastic. However, this is not a limitation of the present invention. The second engaging member 20 includes a base 201 and a protrusion 202, wherein the base 201 has a second obverse 201a and a second reverse 201b opposite to the second obverse 201a. The protrusion 202 is provided on the second obverse 201a of the base 201. In the current embodiment, the protrusion 202 and the base 201 are integrally made. The material of the second engaging member 20 is not limited to be plastic as mentioned above. In other embodiments, the second engaging member 20 could be made of metal as well. A thickness of the base 201 is defined as a first thickness T1. The base has two second bores 201c and two notches 201d, wherein the second bores 201c respectively go through the base 201 and the protrusion 202. The notches 201d are respectively recessed into a peripheral edge of two ends of the base 201 in the direction D1. In addition, as shown in FIG. 8 and FIG. 9, a length of the base 201 of the second engaging member 20 in the direction D1 is defined as a second length L2, wherein the second length L2 of the second engaging member 20 is less than the first length L1 of the first engaging member 18. A width of the protrusion 202 of the second engaging member 20 in the direction D1 is defined as a second width W2, wherein the second width W2 of the protrusion 202 is less than the first width W1 of the hole 18c. Furthermore, as illustrated in FIG. 10, a thickness of the protrusion 202 is defined as a second thickness T2, wherein the second thickness T2 of the protrusion 202 is greater than the third thickness T3 of the first engaging member 18.

As shown in FIG. 5 and FIG. 6, during the process of assembling, the protrusion 202 of the second engaging member 20 first passes through the hole 18c of the first engaging member 18 to make the second obverse 201a of the base 201 to face the first reverse 18b of the first engaging member 18. Then, the second locking members 24 respectively pass through each of the second bores 201c from bottom up, and are locked into a bottom surface of the dividing member 14, whereby to firmly connect the second engaging member 20 and the dividing member 14. Since the second thickness T2 of the protrusion 202 is greater than the third thickness T3 of the first engaging member 18, once the second engaging member 20 is connected to the dividing member 14, the first obverse 18a of the first engaging member 18 would not tightly abut against the bottom surface of the dividing member 14, which would prevent the first engaging member 18 from damaging the bottom surface of the dividing member 14 due to friction.

After installing the second engaging member 20, each of the first locking members 22 respectively passes through one of the first bores 18d of the first engaging member 18 and one of the notches 201d of the second engaging member 20 from top down, and is locked into the corresponding horizontal structural component (i.e., the horizontal structural component 10b). Said first engaging member 18 and said second engaging member 20 are both located in a groove 10c of the corresponding horizontal structural component 10b.

Figure 11:
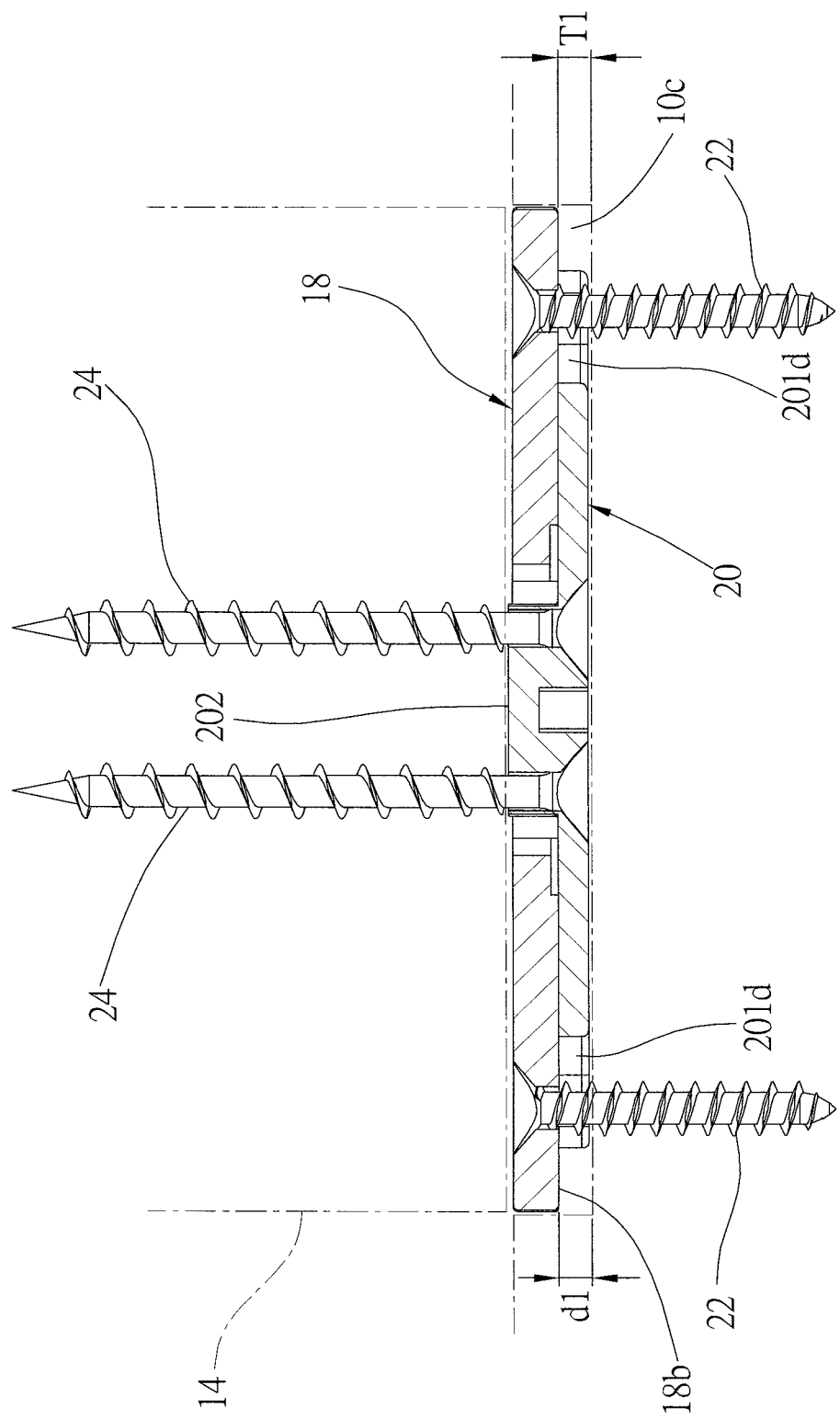
FIG. 11 is a sectional view of the connecting structure of the embodiment of the present invention.
Figure 12:
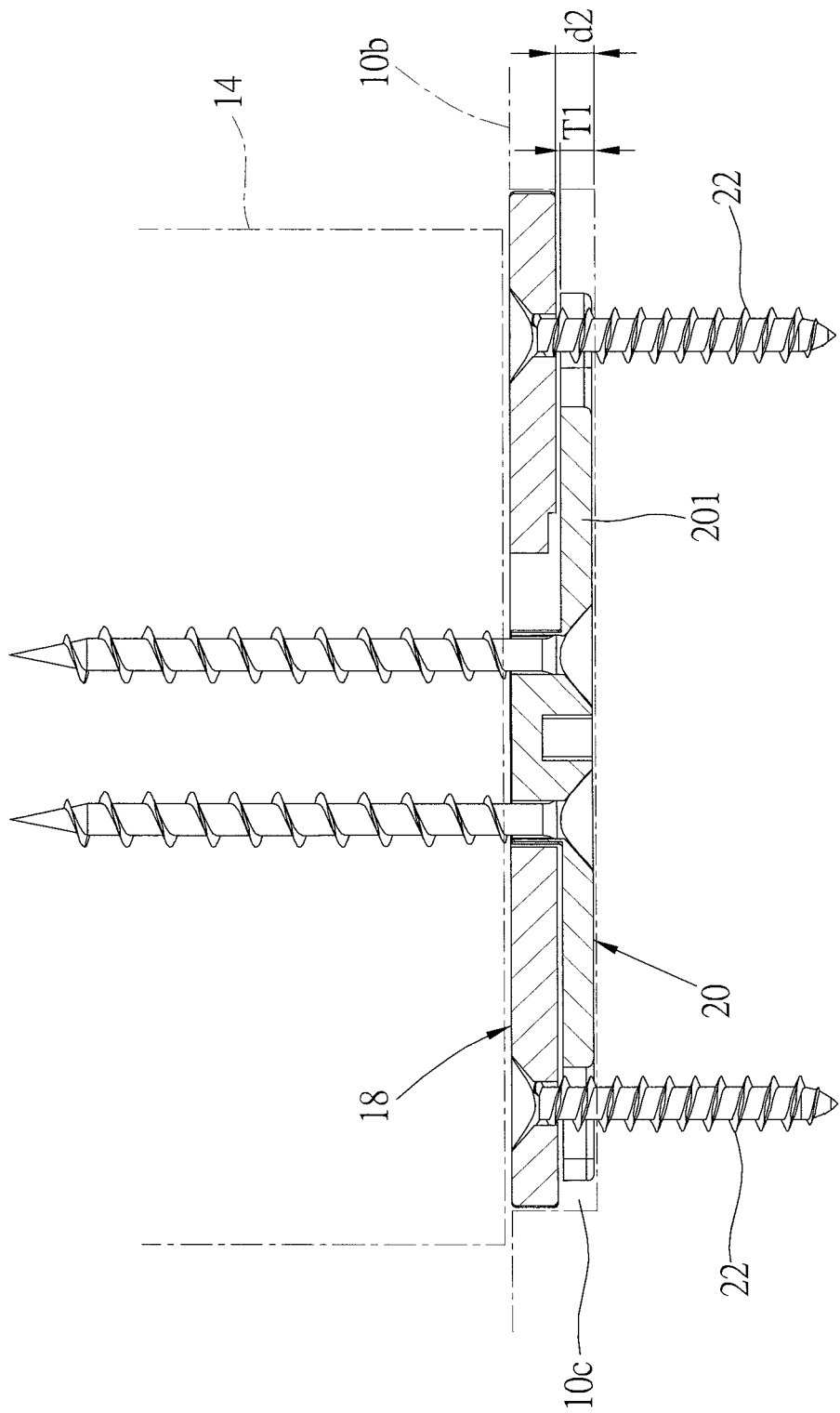
FIG. 12 is similar to FIG. 11, showing the dividing member is moved relative to the frame.

As it can be seen in FIG. 11 and FIG. 12, when each of the first locking members 22 is tightened to make a distance d1 between a bottom surface (i.e., the first reverse 18b) of the first engaging member 18 and a bottom surface of the groove 10c of the corresponding horizontal structural component 10b is less than or equal to the first thickness T1, the first engaging member 18 and the horizontal structural components 10b would tightly press against the second engaging member 20, so that the first engaging member 18 and the second engaging member 20 would not be movable relative to each other. In such a condition, the dividing member 14 would be firmly connected between the horizontal structural components 10a, 10b. The aforementioned distance between the first engaging member 18 and the corresponding horizontal structural component 10b is exemplified by the distance d1 between the bottom of the first engaging member 18 and the bottom of the groove 10c. However, in the case that the frame is not provided with a groove thereon, the distance between the first engaging member 18 and the corresponding horizontal structural component 10b could be represented by the distance between the bottom surface of the first engaging member 18 and a top surface of the corresponding horizontal structural component 10b.

When the position of the dividing member 14 is required to be fine-tuned, the first locking member 22 could be moderately loosened, so that the distance d2 between the bottom surface of the first engaging member 18 and the bottom surface of the groove 10c of the corresponding horizontal structural component 10b would be greater than the first thickness T1. At this time, the second engaging member 20 could be moved along with the dividing member 14, whereby to be moved in the direction D1 relative to the first engaging member 18. Once the dividing member 14 is positioned at the required position, the second engaging member 20 could be tightly fixed between the first engaging member 18 and the corresponding horizontal structural component 10b by tightening the first locking member 22 again. In addition, the dividing member 14 would be firmly connected between the horizontal structural components 10a, 10b again as well.

Thus, by applying the connecting structure of the present invention to two interconnected objects, the relative position of the two objects could be adjusted and then fixed, whereby to enhance the convenience and flexibility of the installation.

Figure 13:
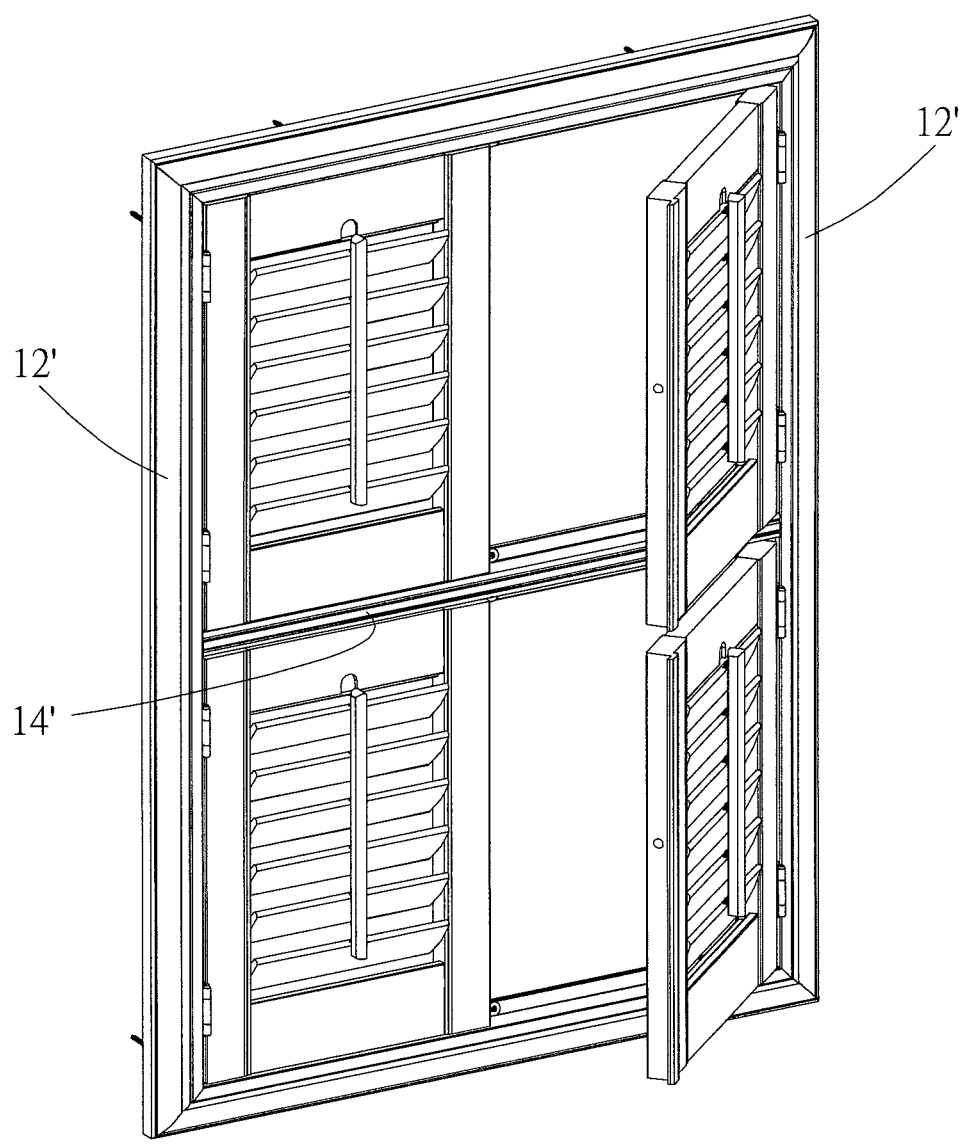
FIG. 13 is a perspective view, showing a covering device for an opening of another building includes the connecting structure of the aforementioned embodiment of the present invention.

In the above embodiment, the dividing member 14 is vertically provided to be connected to the horizontal structural components 10a, 10b. However, in practice, the dividing member could be horizontally provided as a dividing member 14' illustrated in FIG. 13, wherein two ends of the dividing member 14' is respectively connected to vertical structural components 12'. The method of adjusting the dividing member 14' and the effect it could provide are substantially the same as those mentioned or disclosed in the above embodiment, thus we are not going to describe in details herein.

It must be pointed out that the embodiments described above are only some preferred embodiments of the present invention. All equivalent structures which employ the concepts disclosed in this specification and the appended claims should fall within the scope of the present invention.

What is claimed is:
1. A connecting structure, comprising:
a first object;
a second object connected to the first object;
a first engaging member; and a second engaging member located between the first engaging member and the first object, wherein the first engaging member is located between the second engaging member and the second object;

wherein a thickness of the second engaging member is defined as a first thickness; when a distance between the first engaging member and the first object is less than or equal to the first thickness, the first engaging member and the second engaging member are not movable relative to each other; when the distance between the first engaging member and the first object is greater than the first thickness, the first engaging member and the second engaging member are adapted to be moved relative to each other in a direction, moving the first object and the second object relative to each other at the same time;

wherein the first engaging member has a hole, of which a width in the direction is defined as a first width; the second engaging member comprises a protrusion, of which a width in the direction is defined as a second width; the protrusion passes through the hole, and the second width is less than the first width, so that the protrusion is adapted to be moved in the hole in the direction, whereby, when the distance between the first engaging member and the first object is greater than the first thickness, the second engaging member is adapted to be moved relative to the first engaging member in the direction.

2. The connecting structure of claim 1, wherein the first engaging member is connected to the first object; the second engaging member comprises a base, and the protrusion is located on the base; the base is located between the first engaging member and the first object; the protrusion is connected to the second object.

3. The connecting structure of claim 2, wherein the distance between the first engaging member and the first object is a distance between a bottom surface of the first engaging member and a top surface of the first object; the first thickness of the second engaging member is a thickness of the base of the second engaging member.

4. The connecting structure of claim 2, wherein a thickness of the protrusion of the second engaging member is defined as a second thickness; a thickness of the first engaging member is defined as a third thickness; the second thickness is greater than the third thickness.

5. The connecting structure of claim 2, further comprising at least one first locking member connecting the first engaging member and the first object, and at least one second locking member connecting the second engaging member and the second object.

6. The connecting structure of claim 5, wherein the first engaging member has at least one first bore; the second engaging member has at least one second bore and at least one notch; the at least one second bore goes through the base and the protrusion; the at least one notch recesses into a peripheral edge of the base in the direction; the at least one first locking member passes through the at least one first bore and the at least one notch to be locked into the first object; the at least one second locking member passes through the at least one second bore to be locked into the second object.

7. The connecting structure of claim 1, wherein a length of the first engaging member in the direction is defined as a first length; a length of the base of the second engaging member in the direction is defined as a second length; the first length is greater than the second length.

* * * * *